ERNEST L. POTTS
INVENTOR.

BY

ATTORNEY

ERNEST L. POTTS
INVENTOR.

BY

ATTORNEY

United States Patent Office

3,386,384
Patented June 4, 1968

3,386,384
MULTIPLE POWER CONSUMING DEVICES
Ernest L. Potts, Houston, Tex., assignor to
Cicero C. Brown, Houston, Tex.
Continuation-in-part of application Ser. No. 522,764,
Jan. 24, 1966. This application June 27, 1966, Ser.
No. 560,412
8 Claims. (Cl. 103—49)

ABSTRACT OF THE DISCLOSURE

A multi-plex pumping system employing a power fluid distributing system supplying power fluid serially to the pump units and including means responsive to the relative loads on the respective units for correspondingly varying the power fluid distribution to the respective pumping units to smooth out the operation thereof.

---

This invention relates to power distribution means adapted for use with power consuming devices, and more particularly relates to pumping apparatus of a new and improved nature utilizing the power distribution means.

This application is a continuation-in-part of copending United States patent application Ser. No. 522,764, filed Jan. 24, 1966.

Pumps known in the prior art for oil field use are generally crank driven mechanisms wherein a rotary power source communicates by way of a crank throw with a piston for pressurizing various and sundry liquids. As a generalization, they are quite large and heavy, and by of example, apparatus of the same power as the preferred embodiment of the present invention will approximate 60,000 pounds of weight whereas the present invention will weigh about 4,000 pounds.

The periodic oscillations of prior art pumps are communicated through connective piping and other associated equipment. Of necessity, it will be appreciated that higher peak pressure is required to equal the flow associated with a constant pressure so that for a given flow volume, pumps of the prior art must output pressure peaks to obtain the desired average flow.

Occasionally, the load acting on various pumps in an installation is subject to variation and the power demands of the pumps vary in response to the load. Variable power demands in hydraulically operated equipment can sometimes be met by a greater volume of pressure fluid; however, quite often, a greater pressure drop is required which is impossible in parallel connected equipment. While the example has been stated in terms of pumps, it will be further appreciated that the problem exists in other power consuming devices such as fluid motors and the like. At any event, the present invention provides a device whereby pressure fluid can be imparted to a plurality of power consuming devices subject to variations in load wherein the power distribution to each device is responsive to the demands of the device.

Accordingly, it is an object of the present invention to provide new and improved pressure fluid distribution means for use with power consuming devices subject to load variations wherein series distribution of pressure fluid is tailored to the instantaneous power demands of the devices.

One object of the present invention is to provide new and improved power fluid distribution means for use in hydraulically operated pumps wherein variable power delivery capabilities are provided for serially connected pumps.

Other objects and advantages are set forth in the aforementioned copending patent application and relate more particularly to a hydraulically driven multiplex, piston-type pump.

The present invention is particularly directed to a new and unobvious control arrangement for hydraulic power supply apparatus wherein power flow through serially connected pumps is made independent of one another.

One object of this invention is to provide new and imprived pumps which overcome the above noted disadvantages and limitations of conventional pumps employed in the various services noted above.

Other objects and advantages of the present invention will become more readily apparent upon consideration of the written specification and the following drawings wherein.

Figure 1:
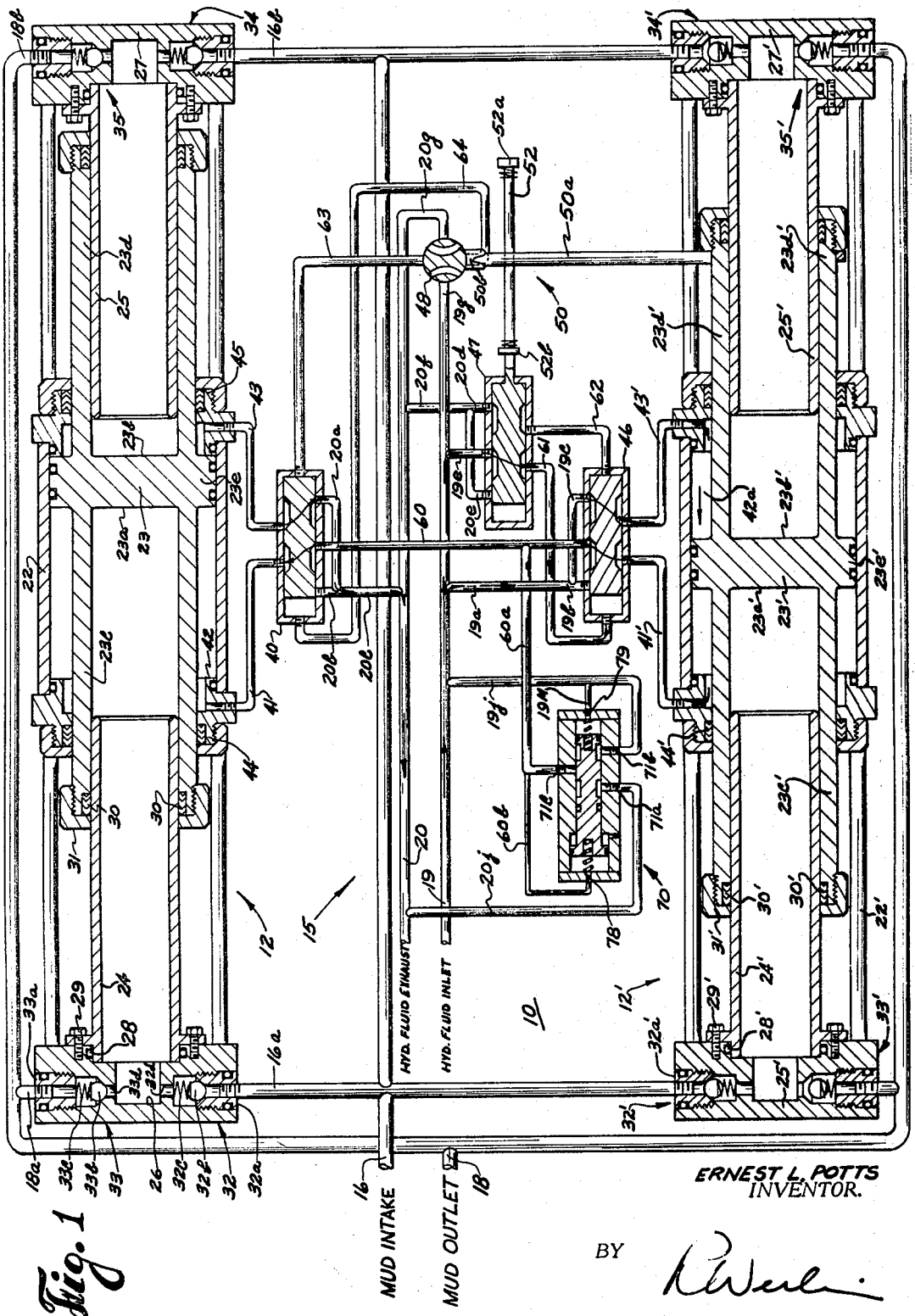
FIG. 1 is a view of the fluid distribution means of the present invention and pump apparatus shown in sectional view, and wherein the fluid distribution means is schematically represented.
Figure 5:
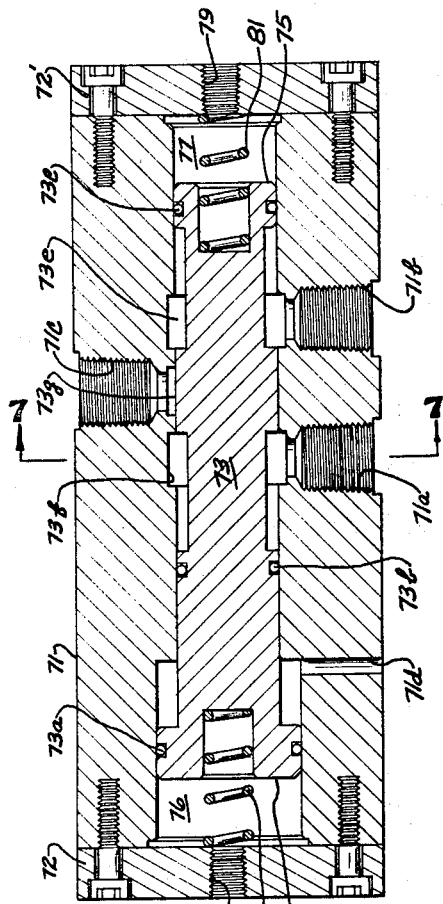
FIG. 5 is a sectional view of a valve of the fluid distribution ssytem of the present invention.
Figure 7:
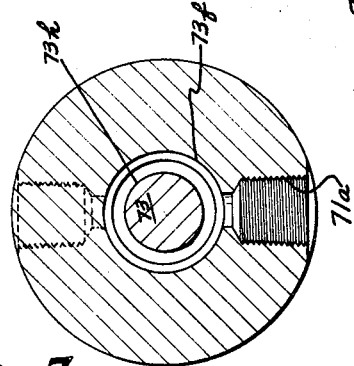
Figure 8:
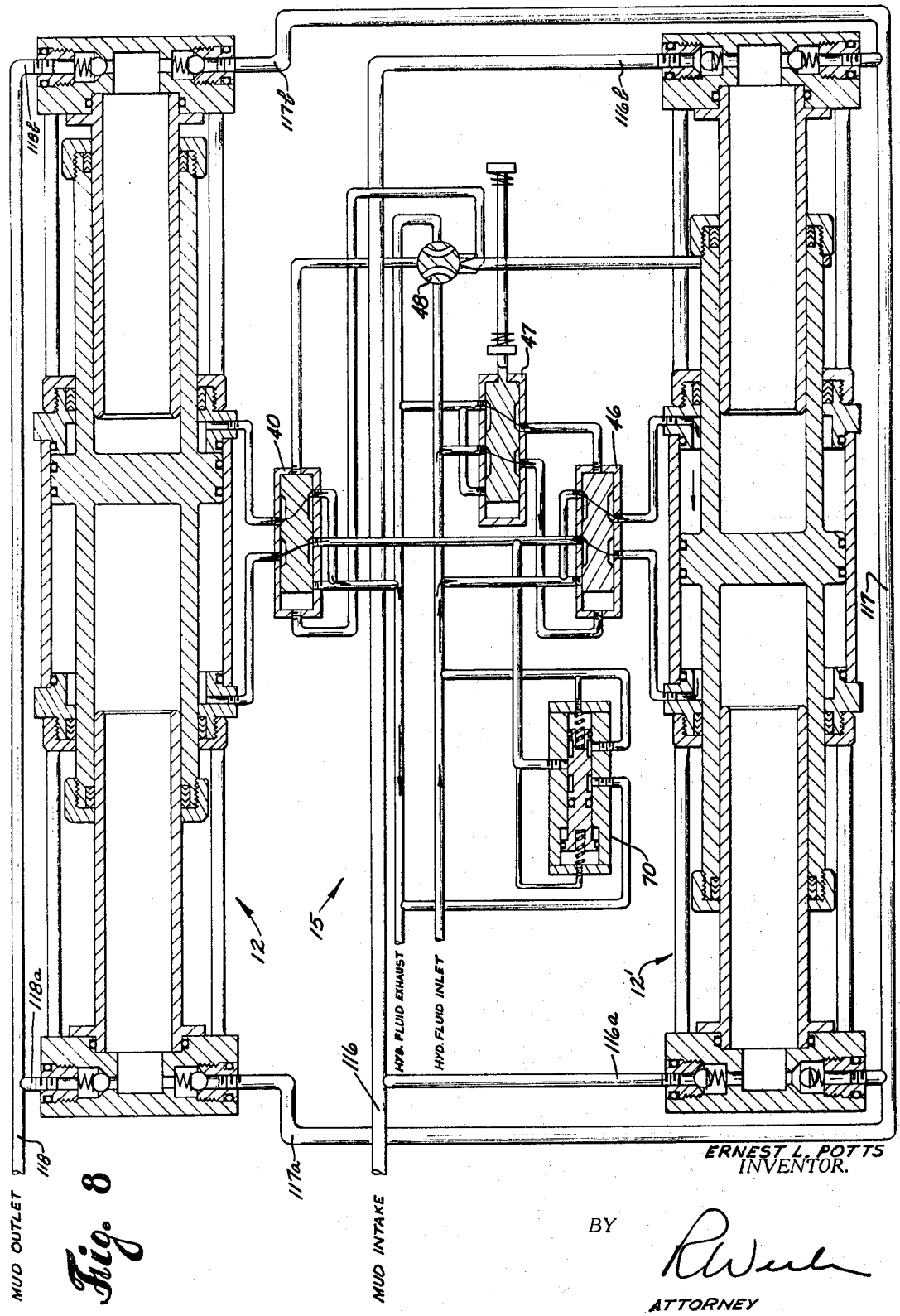
Figure 9:
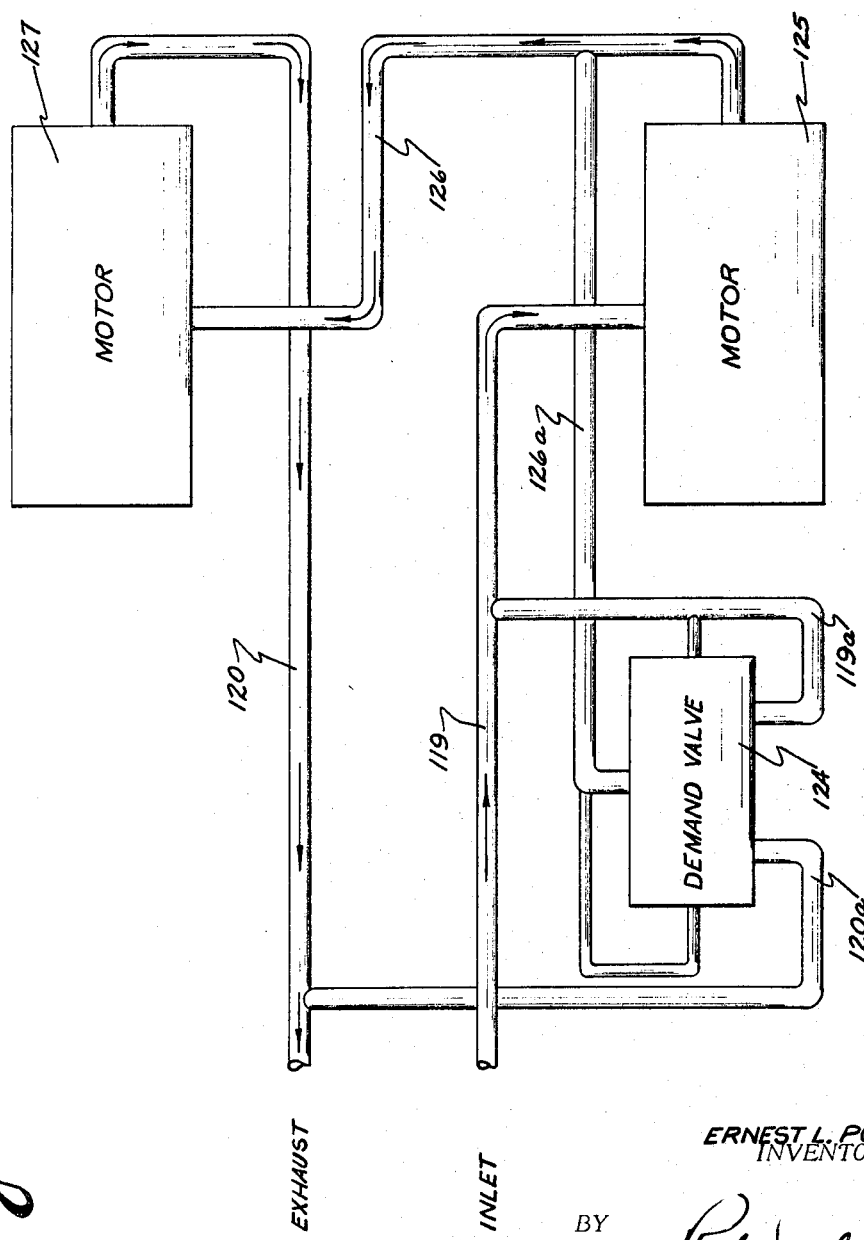

FIG. is a view similar to FIG. 5 in which the valve by-passes fluid as will be described;

FIG. 7 is a sectional view taken along the line 7—7 of FIG. 5 for illustrating greater details of the spool valve of FIG. 5;

FIG. 8 is a serially connected mud pumping apparatus contrasted with the parallel pumping arrangement shown in FIG. 1; and FIG. 9 is a generalized schematic of the present invention shown co-operating with a pair of power consuming devices.

Considering the invention in general, attention is first directed to FIG. 1 which illustrates pumping apparatus denoted generally by the numeral 10 which includes, in the main, a first pump 12 and a pressure fluid distribution means indicated generally at 15. The structure shown in FIG. 1 is particularly adapted for multiple operations, and to this end, a second pump is shown in FIG. 1 and is denoted by the numeral 12'. The pumps 12 and 12' are, for all intents and purposes, identical and therefore, the presently included description will be directed to the pump 12 and will apply equally to the pump 12', it being noted that primed reference numerals will be applied to the pump 12'.

Generally, the pump apparatus 10 is provided with a mud inlet 16 and a mud exhaust or outlet 18 for delivering drilling mud or other fluids under high pressure. The pressure fluid distribution system 15 is communicated with a hydraulic pressure fluid inlet 19 and an exhaust or sump return is provided at 20. Briefly, the hydraulic fluid is delivered through the inlet 19 and is distributed by the means 15 to the various pumps 12 and 12'. In accordance with variations the pump loads, the pressure fluid is distributed to the pumps and, briefly, one noteworthy result is proper tailoring of the energy to the loads acting on the pumps.

Attention is directed first to the pump 12 for a description of its apparatus and operation after which the fluid distribution means 15 will be described.

As a generalization, the pump 12 is a double-acting pump wherein the fluid to be pumped is located on both sides of the piston. Moreover, the pump 12 is arranged with concentric volumes wherein the center or axial volume receives the fluid to be pumped and the encircling volume receives the pressure fluid whereby the piston is moved.

The pump unit 12 includes a supporting cylinder 22 which receives therein a piston 23 having faces 23a and 23b spaced oppositely of cylindrical volumes to be described. In addition, the piston 23 carries concentrically-arranged, projecting, cylindrical structures 23c and 23d sealingly engaged with a pair of fixed cylinders 24 and 25. The cylinders 24 and 25 are further defined by cylinder heads 26 and 27, respectively, which form a fluid tight seal with the cylinders 24 and 25. Considering first the structure at the left-hand side of FIG. 1, the cylinder head 26 is sealingly joined with the cylinder 24 by a seal 28, and stud bolts 29 are passed through appropriate bolt holes in a skirt affixed to the cylindrical sleeve 24 for joining same to the cylinder head 26. The same arrangement is found on the sleeve 25 and cylinder head 27.

The cylindrically shaped extension 23c of the piston is sealingly joined with the cylinder 24 by a seal member 30. Moreover, a seal nut 31 is threadedly joined to the piston sleeve 23c to clamp the seal 30 in place. It will be appreciated that the sealing relationship between the sleeve 23c (a part of the piston) and the cylinder 24 effects a fluid tight cylinder for pumping purposes as will be described. Since the right-hand end of the pumping unit 12 is similar, a pumping chamber is effected on the opposite side of the piston.

The cylinder head 26 includes various valving arrangements for providing the fluid to be pumped at the proper time. Specifically, the mud intake 16 is communicated by conduit 16a to the cylinder head 26. A check valve means 32 in the cylinder head 26 admits mud from the intake 16. The check valve structure includes a plug 32a received interiorly of the threaded opening in the cylinder head 26 and seats a ball 32b biased by a spring 32c to close the valve 32. Pressure adequate to overcome the spring 32c urges fluid through a passage 32d into the cylinder 24.

The check valve 32 admits fluid to the chamber 24. Increase of pressure within the chamber 24 does not cause the valve to open for flow in the opposite direction. On the other hand, an additional check valve means is provided at 33 wherein the ball and spring permit flow in the opposite direction. A passage 33d communicates with the ball 32b which acts against the spring element 33c held in place by the plug 33a. On developing pressure interiorly of the cylinder 24, the spring 33c is overcome to flow pumped fluid through the conduit 18a. It will be noted that the outlet line 18 communicates with both ends of the pumping unit 12 wherein the pumping unit 12 is double-acting and pumps fluid on movement of the piston in both directions.

The pumping volume is defined within the cylinder 24, the cylinder head 26, and the face 23a on the piston 23. It will be appreciated that the piston reciprocates towards the cylinder head 26 and that the cylinder extension 23c passes over the cylinder 24 in a sealing relationship to expand and contract the chamber. The intake stroke of the piston 23 draws fluid in through the conduit 16a and check valve 32 into the cylinder 24. The compression stroke compresses the fluid within the cylinder 24 and urges same through the check valve 33 and into the conduit 18a.

It should be emphasized that the foregoing describes only the pumping apparatus shown at the left-hand end of the unit 12. Similar apparatus at the opposite end includes a check valve 34 similar to the check valve 32. Additionally, the cylinder head 27 incorporates check valve 35 similar to check valve 33. The fluid intake 16 communicates with the conduit 16b and the check valve 34, and mud underpressure flows through the check valve 35 to the conduit 18b which is parallel to the conduit 18a. The only distinction in the left-hand and right-hand units is the phase relationship. The intake stroke for the left-hand unit is the compression stroke for the right-hand pumping apparatus. Thus, when the valve 32 is opened to inflow fluid to the left-hand cylinder, the valve 35 at the right-hand end is opened to expel fluid under pressure to the collection line 18. Likewise, the movement of the piston 23 in the opposite direction results in an intake stroke for the right-hand pumping apparatus wherein the check valve 34 is opened. Thus, the pump is a double-acting pump wherein strokes in either direction are compression strokes and intake strokes for the multiple pumping units shown.

The description so far has been devoted to the pumping apparatus from the point of view of fluid to be pumped. However, attention is now directed to the means provided with the pump unit 12 for imparting power thereto. The hydraulic fluid line 19 communicates (as will be described) with the inlet side of the valve 40. The valve 40 communicates fluid through a line 41 to an input means 42. The means 42 includes a seal and a flanged seal clamp whereby fluid is emitted interiorly of the cylinder 22. Moreover, a seal carrier and associated seal is indicated at 44 for sealing the chamber defined by the inner wall of the cylinder 22, and the outer wall of the piston extension 23c. A similar seal arrangement is located at 45 at the opposite end of the chamber, it being noted that an encircling piston extension 23e is located in the chamber. The pressure fluid is admitted through the line 41 and the fitting 42 and expands within the chamber between the seal 44 and the piston extension 23e. On the low pressure side of the piston extension 23e, an exhaust line 43 is communicated with the chamber and also is connected to the valve 40 for return to the hydraulic fluid exhaust means 20 previously described.

In operation, the flow of fluid through inlet 19 and apparatus to be described to the valve 40 is communicated through the conduit 41 into the chamber. A directional arrow indicates flow into the line 41 from the valve 40. The high pressure of the fluid forces the piston extension 23e toward the opposite end of the chamber. The stroke of the piston 33 is limited by reversal of the spool valve 40 as will be described hereinafter. FIG. 1 illustrates the piston extension 23e at the extremity of its stroke and in position for return on operation of the spool valve 40.

Little has been said to this point concerning the pump unit 12'. As previously noted, the pump unit 12' is identical in practically all respects to the unit 12 discussed above. However, certain differences relating the operation of the one unit to the other should be noted as follows. The pump unit 12' is provided with hydraulic fluid through the spool valve 46. Operation of the spool valve 46 is in timed relationship to operation of the valve 40 previously described. A control spool valve 47 and a plug valve 48 are provided for timing the operation of the pump unit 12' with respect to the pump unit 12. Specifically, this is achieved by utilization of a cam and cam follower indicated generally at 50. The cam 50a is carried on the piston extension 23d' of the pump unit 12' and reciprocates therewith. The cam extension 50a is located so that the cam is contacted with cam follower 50b at midstroke as shown in FIG. 1. The centered location operates cam follower 50b to reverse the four-way plug valve 48 at the mid-stroke position of the piston 23'. This corresponds to a 90° phase difference in operations of the two pistons 23 and 23'. The phasing relationship achieved by the cam 50a and follower 50b will be further discussed hereinafter.

It should be noted that the cam follower 50b and the plug valve 48 are rotated approximately one-quarter revolution for each actuation thereof.

Attention is next directed to the fluid distribution means indicated generally at 15. Control valve 48 alternates the spool valve 40 to deliver the pressure fluid to opposite faces of the piston 23 resulting in reciprocation of the piston within the cylinders. In like manner, valve 47 controls spool valve 46 to reciprocate the piston 23' in response to the position of the spool of the valve 46.

Control of the valve 47 is achieved by a plunger means 52. The plunger means 52 has a pair of stops 52a and 52b. Stops 52a and 52b engage the cam 50a to actuate the spool within the valve 47. It should be noted that bumper means such as the coil springs are preferably utilized to soften contact of the cam 50a against the stops 52a and 52b. In both cases, however, it will be appreciated that movement of the cam 50a causes movement of the control means 52 to thereby position the spool to the right or to the left.

It is appropriate to consider distribution of the fluid to the two pumping units 12 and 12' at this time. Hydraulic fluid is inlet through the line 19 and is directed by the branch 19a to the spool valve 46. The valve 46 has a pair of inlet ports 19b and 19c. The choice of ports is dictated by the position of the spool within the valve 46. As shown in FIG. 1, with the spool at the right, fluid flow is through the port 19c and into the fluid conduit 43'. The fluid acts against the piston extension 23e' and the piston is driven to the left as indicated by the arrow 42a to expel fluid from the chamber under pressure through the conduit or line 41'. The fluid expelled through the conduit 41' passes through the spool valve in the direction indicated by the arrow and flows through the fluid conductor 60 to the spool valve 40. The conduits 41 and 43 alternate the fluid supply to the piston 23 to control the direction of movement of the piston. Moreover, the valve 40 exhausts fluid through the spool to either ports 20a or 20b. The ports 20a and 20b communicate with the conduit 20c to return the fluid to the exhaust line 20. This returns the fluid to the pumping apparatus for recirculation through the apparatus of the present invention.

In retrospect, it will be first noted that the fluid first goes to the pump unit 12' through the line 19a and then to the conduit 60. At this juncture, it should be noted that under ideal conditions, the pressure drop is approximately one-half the source pressure. By way of example, if hydraulic fluid is supplied at approximately 3,000 p.s.i. in the conduit 19, fluid in the line 60 approximates 1,500 p.s.i. Then, the pump unit 12 extracts the remaining energy from the fluid so that the fluid in the line 20c communicating with the exhaust 20 is approximately at zero pressure for return to the sump. Back pressure in the sump is usually insignificant.

The above-noted pressure drops occur in ideal conditions in which the loads on the pump units 12 and 12' are approximately equal.

A consideration should be extended to the fluid supply of the control valves 47 and 48. The conduit 19 communicates with the spool valve 47 by means of the conduit 19e. The valve 47 routes the fluid to lines 61 or 62. The choice of lines is directed by the position of the spool in the valve 47 and as indicated in FIG. 1, the flow is through conduit 61 to the left-hand end of valve 46. When the spool is in the opposite position in the valve 47, the flow is through the conduit 62 at the right-hand end of the valve 46. For the fluid return, the line 61 and line 62 are commutated by the spool to ports 20d and 20e with the conduit 20f connected with the sump return 20. The control valve 48 is provided with fluid by the conduit 19g and alternates between conduits 63 or 64. The conduits 63 and 64 communicate with opposite ends of the pump valve 40 to position the spool. When the spool is positioned at the right as shown in FIG. 1 by pressure communicated through the line 64, the fluid is also expelled through the conduit 63. The position of the spool shown in FIG. 1 obstructs fluid flow to maintain the position of valve 40.

In retrospect, it should be noted that both the valves 47 and 48 provide control for the pump valves 40 and 46 by positioning the spools therein.

Attention is next directed to the control valve indicated generally at 70. The control valve 70 is provided to by-pass the power consuming devices, which, in FIG. 1, are the pump units 12 and 12'. The control valve 70 has an input conduit 19j from the hydraulic fluid inlet 19. In addition, the conduit 20j also communicates the sump to valve 70. The valve 70 incorportes a third inlet which is the conductor 60a. The spool of the valve 70 is provided to control the connection of high pressure or low pressure fluid to the line 60. The valves 40, 46, 47, and 48 previously described all have only two positions in which fluid flow through the valves is essentially uninhibited. On the other hand, the valve 70 provides fluid communication between the conduit 60 and the inlet 19 or the exhaust 20 in varying degrees. This is achieved by positioning the spool of the valve to one of a multitude of positions. For a greater understanding of the functions of the valve 70, attention is next directed to the enlarged view of the valve 70 shown in FIGS. 5–7, inclusive.

The valve shown in FIG. 5 includes the valve body 71. The cylindrical structure 71 is sealed by a pair of end plates 72 and 72'. A slidable spool 73 within the valve body 71 responds to pressure at each of the two ends. The spool 73 incorporates a face 74 of a predetermined size. The opposite end is provided with a face 75 which is approximately one-half in surface area of the face 74. The spool face 74 abuts a chamber 76 adapted to receive pressure fluid therein while the face 75 is confronted by a fluid chamber 77. The end plates 72 and 72' are provided with pilot valve openings indicated at 78 and 79, respectively. The body of the valve is provided with ports indicated at 71a, 71b, and 71 c. The valve port 71a is communicated with the hydraulic fluid exhaust line 20 (see FIG. 1) while port 71b is communicated with the hydraulic fluid inlet line 19. In addition, port 71c is communicated with the fluid conduit 60, it being recalled that conduit 60 carries fluid at approximately one-half the pressure supplied in the inlet 19.

The spool is positioned in a central or neutral position by a pair of springs 80 and 81. The neutral position of the spool 73 is achieved by equal spring bias in the springs 80 and 81. As noted hereinabove, the pressure in the fluid conduit 60 is approximately one-half the original pressure provided in the fluid inlet 19. This pressure is communicated with the port 78 by fluid line 60b (see FIG. 1) to act against one end of the spool. The opposite end of the spool is exposed to fluid communicated by the conduit 19m which communicates with the fluid inlet 19.

The position of the spool valve 70 is determined in part by the spring bias of the coiled springs 80 and 81. However, since the springs are of equal strength, the neutral position is maintained subject to movement by the variations in fluid pressure. In the ideal circumstance, the left-hand face 74 is exposed to fluid pressure which approximates one-half the inlet pressure in the conductor 19. On the other hand, the port 79 communicates with the highest possible pressure found in the system and thereby exposes the face 75 to a pressure approximately twice the pressure placed on the left-hand end of the spool. In the circumstances of the preferred embodiment, the left-hand face is twice the size of the right-hand face so that a pressure of one-half the inlet pressure maintains the spool in a centered, neutral position as indicated in FIG. 5. The central position blocks fluid flow through ports 71a, 71b, and 71c and no fluid flows through the valve 70 of the present invention.

Prior to discussion of operation of the spool valve 70 of the present invention, it should be noted that suitable seal means are provided at 73a for sealing the left-hand face and associated chamber 76 from the back face of the spool. Moreover, an air or bleed hole 71d is provided to exhaust the nether side of the face 74. The port 71a is sealed from the left-hand portions of the valve by means of the seal indicated at 73b. In addition, a similar seal is located at 73c to isolate the chamber 77. The port 71b opens into an encircling chamber 73e extending fully about the spool 73. In like manner, the port 71a is positioned adjacent an encircling passage 73f. The port 71c opens toward a sealing shoulder 73g on the spool 73. The spacing between the shoulder 73g and the valve body 71 seals the port 71c against fluid flow to either port 71a or 71b when the valve is in the neutral or centered position shown in FIG. 5. The shoulder 73g is defined by a pair of encircling grooves 73h and 73i shown in FIG. 6.

Figure 6:
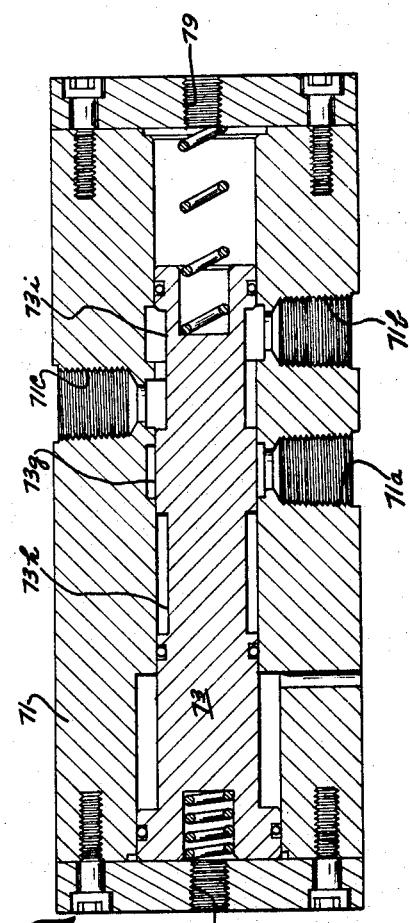

The valve 70 is shown in FIG. 6 in an operative position. The valve spool 73 is at the left in response to a decrease of pressure in the conduit 60 (see FIG. 1). In other words, the pressure at the right-hand end of the spool 73 is at least twice the pressure at the left-hand end of the spool 73. Therefore, given the ratio of two to one between the areas of the end faces of the spool, it will then be appreciated that a ratio of two to one is achieved to position the valve at the neutral location; failing this, the position of the spool is varied to respond to pressure variation whereby fluid flow is achieved through the demand valve 70 resulting in return of the valve spool 73 to its neutral position. The relationship of the valve to the fluid distribution means 15 will be described hereinbelow.

Briefly, the connections of the conditions to the valve 70 can be viewed as by-pass routes extending across both of the power consuming devices, the pump units 12 and 12' shown in FIG. 1. Thus, the by-pass for the higher pressure unit 12' can be thought to be the route through the valve 70 including the conduit 19j and conduit 60a. The significance of this is that the introduction of high pressure fluid from the inlet 19 to the conduit 60 raises the pressure in conduit 60. This in turn tends to raise the pressure at the outlet of the pump unit 12' and thereby adjusts the operating pressure between the two units. In addition, a by-pass exists for the pump unit 12 and incorporates a route through the spool valve 70 communicating the line 60 with the conduit 20. Again, this by-pass route operates to adjust the pressure at the mid-point 60, it being noted that the pressure in the exhaust 20 is fixed and determined only by the back pressure in the sump. Moreover, the valve 70 of the present invention accommodates fluid flow whereby the pressure is adjusted inversely to the load on the two pump units 12 and 12'. Again, by way of example, should the pump unit 12' require excessive pressure drop, such pressure drop being in derogation of the pressure drop across the pump unit 12, the desired drop is achieved by lowering the pressure in the conduit 60. The valve 70 lowers the pressure in the conduit 60 by communicating the conduit line 60a with the sump return 20j, thereby lowering the pressure between the two units. This increases the pressure drop across the pump unit 12' and decreases the pressure drop across the pump unit 12.

Referring again to FIG. 6 for completion of the description of operation of the valve 70, fluid flow is effected from the port 71c to the port 71b. The open valve exposes pump pressure to the half point pressure found in the conduit 60 and fluid will by-pass the first or higher pressure unit, the pump unit 12' in the preferred embodiment. In this respect, it will be noted that the shoulder 73g formed on the exterior of the spool and the adjacent encircling neck 73i route the fluid flow between the ports 71b and 71c.

Attention is directed to FIG. 7 which illustrates the port 71a in sectional view. It will be noted there that the reduced portion is indicated at 73h in the sectional view, and moreover, the enlargement surrounding the location of the valve which is indicated at 73f is further indicated in FIG. 7 and the pathway provided about the spool 73 is more than adequate to accommodate full fluid flow through the valve of the present invention.

Figure 2:
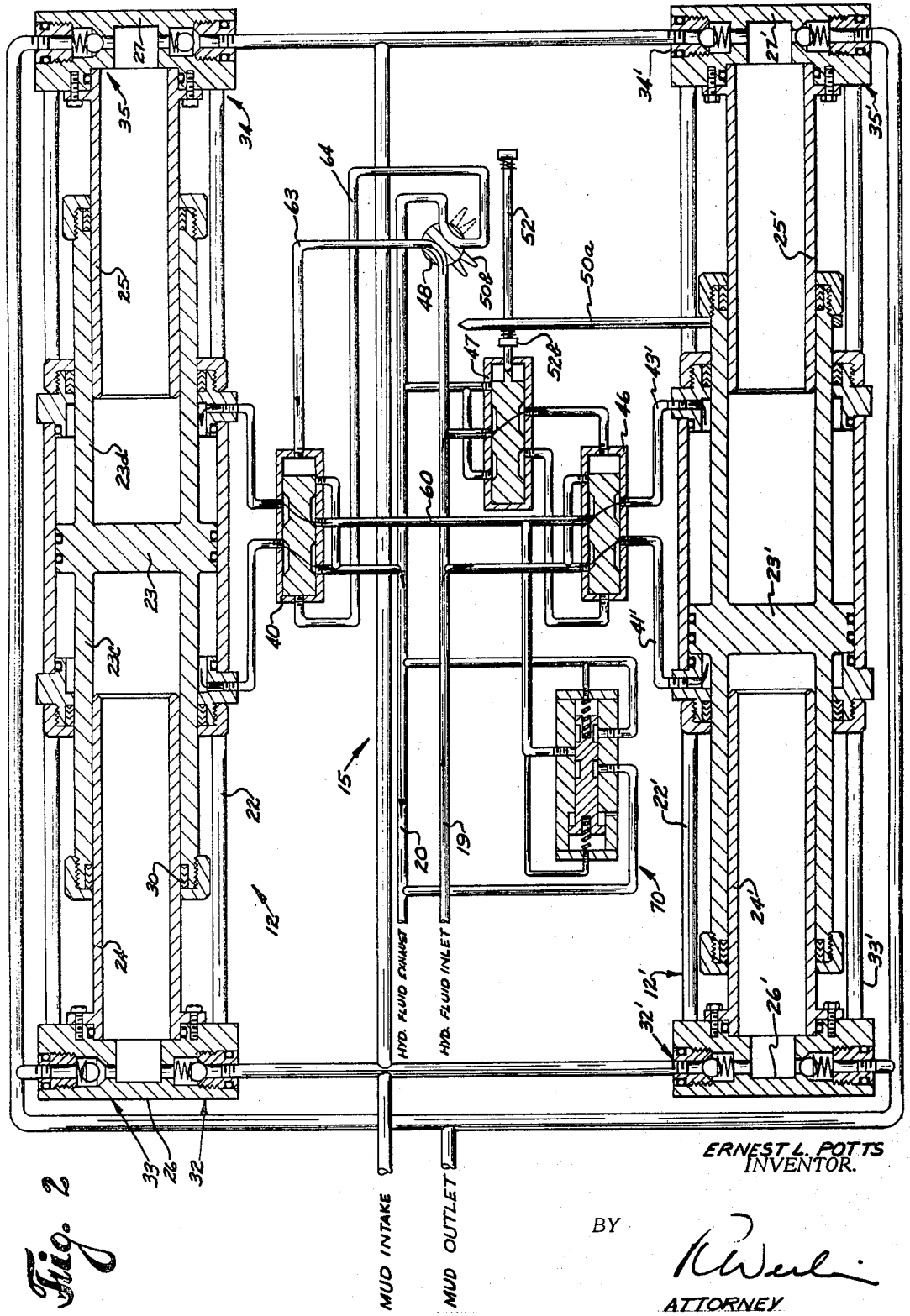
FIG. 2 is view similar to FIG. 1 differing in that the pump cycle has moved the pistons through 90° of the cycle of operation.

Attention is directed to FIG. 2 which is similar in disclosure to the structure of FIG. 1 but wherein emphasis is made of the phase relationship of the pumps of the present invention. FIGS. 1 and 2 are identical with the exception that the pistons are shown at different points of their cyclic operation. The drawings show the piston 23 shifted from the right-hand extremity of movement to the mid-point in FIG. 2. This corresponds with 90° of the operative cycle of the device. Also, the piston 23' is shifted 90° from the central position shown in FIG. 1 to the left-hand end of the pump unit 12'.

The motion of the two pistons as noted above is achieved by the valving arrangements as will be noted. In FIG. 2, the cam 50a is shown at a position quite removed from the cam follower 50b after having opened the plug valve 48 to fluid flow through the conduits 63 and 64. As previously recalled, the valve 48 is a control valve for the valve 40 which operates the pump unit 12. The drawings contrast the position of the spool in the valve 40 and the direction of flow therethrough whereby the inlet and exhaust routes through the valve 40 are alternated.

The cam follower 50a is shown engaging the stop 52b to move the spool of the valve 47 to the left to alternate the flow through the valve 47. The control valves 47 and 48 maintain the phased relationship of the pump units 12 and 12' repetitively for an indefinite number of operations.

Figure 3:
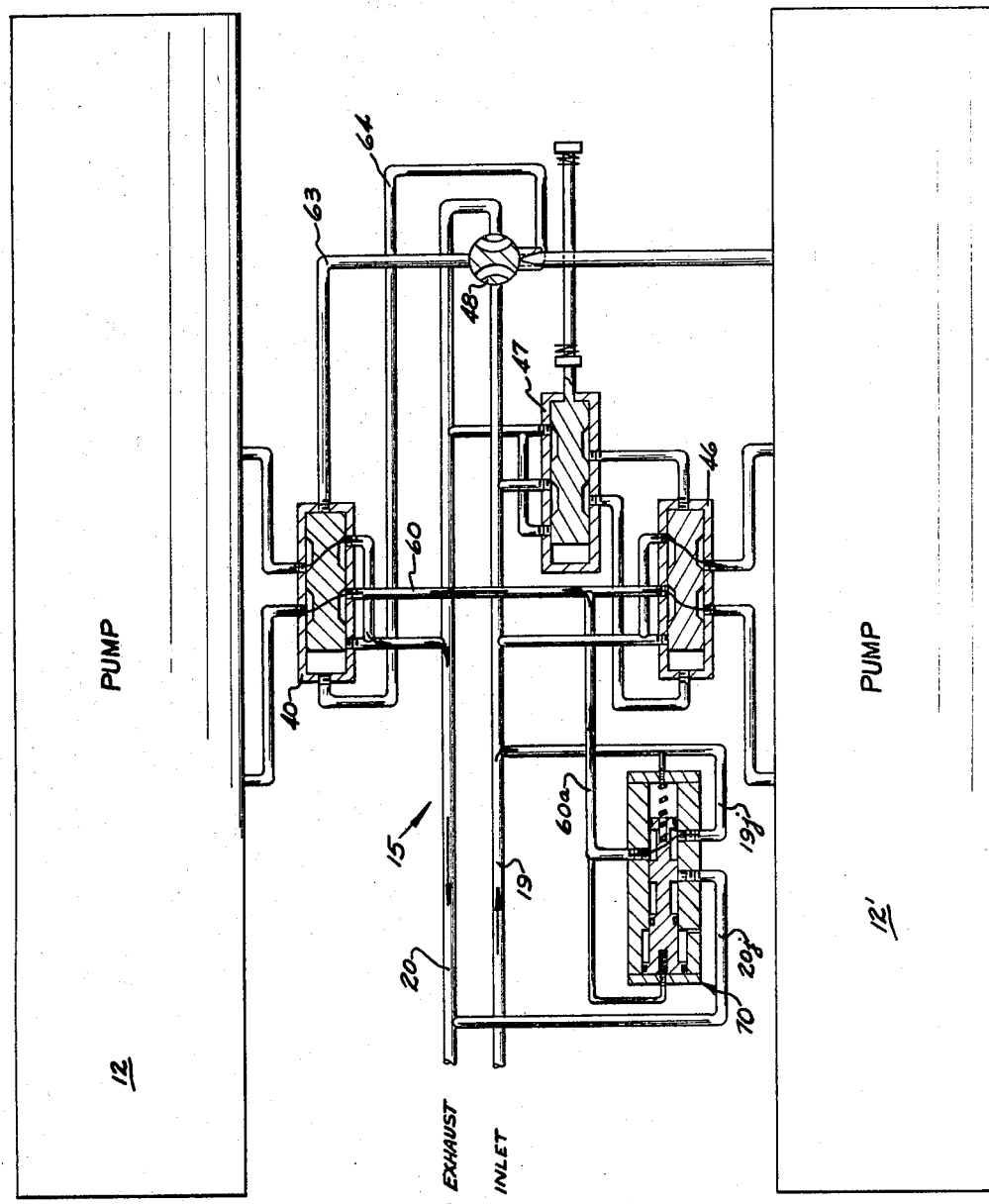
FIG. 3 is a partially schematic and partially sectional view of the fluid distribution system means of the pressent invention.

Attention is next directed to FIG. 3. The operative condition of the valves 40, 46, 47, and 48 in FIG. 3 is identical to FIG. 1 which shows the pistons 23 and 23' at the same positions. Attention is directed to valve 70 shown in FIG. 3. The valve 70 is opened by the spool movement to the left. For present purposes, it is helpful to designate the pump unit 12' as the high pressure unit and the unit 12 as the low pressure unit resulting from the serial connection of the pressure source whereby the unit 12' receives the fluid first and at a higher initial pressure. Again, it should be noted that ideally pressure in the conduit 60 is one-half of the pressure in the line 19, indicative of the fact that the units 12 and 12' are deriving approximately equal power from the hydraulic source. However, the valve 70 in FIG. 3 is shown in an operative position whereby pump unit 12' is by-passed. Thus, fluid at the highest pressure (in the line 19) is communicated through the valve 70 directly to the line 60. This tends to raise the pressure in the line 60 and consequently tends to decrease the pressure drop across the pump unit 12'. The power delivered to the pump unit 12' is decreased and more power is delivered to the unit 12. The spool valve 70 responds to the vagaries of the loads of the units 12 and 12' whereby imbalance of the loads achieves compensation in a higher pressure drop across the unit having the greater demand.

Figure 4:
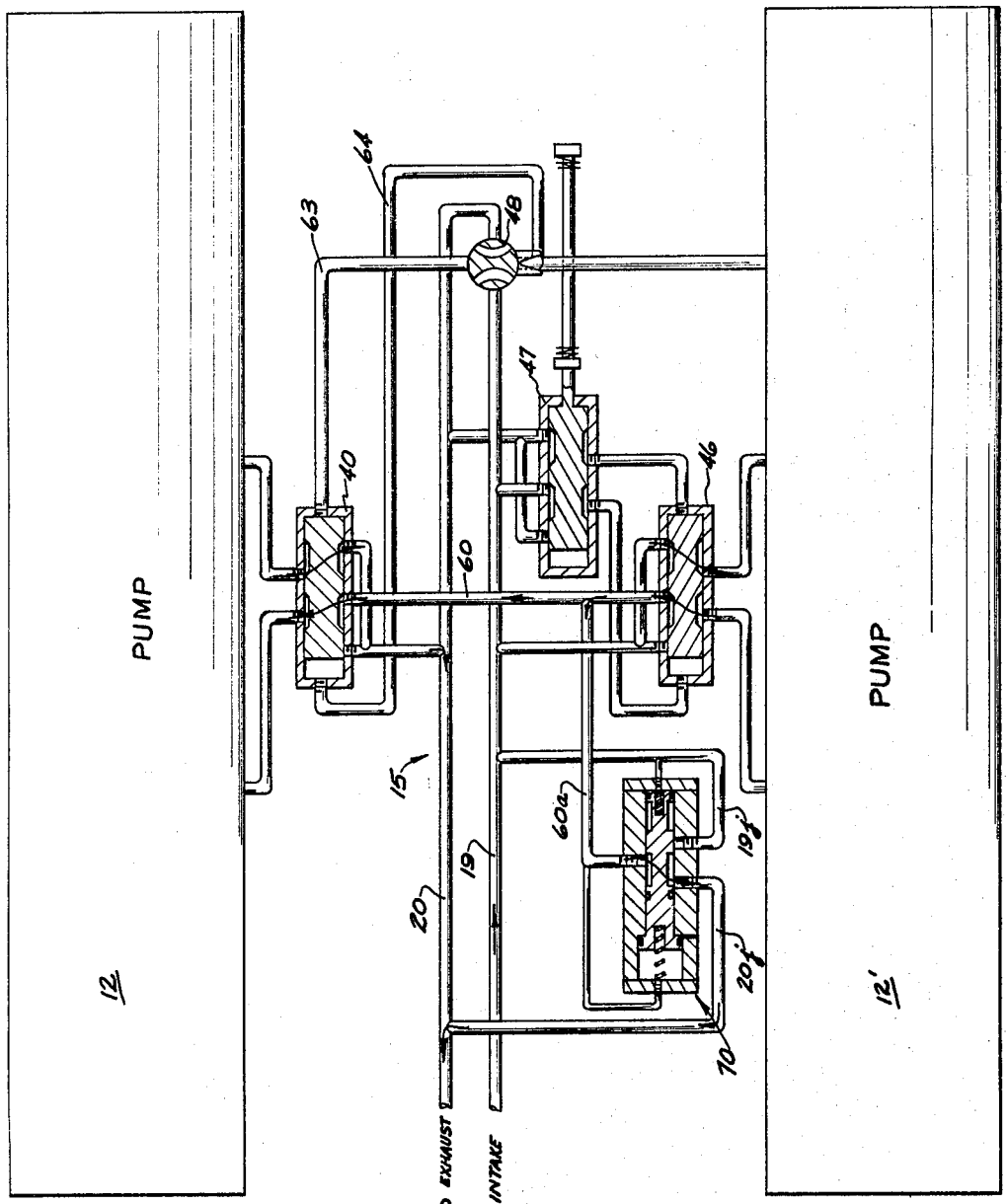
FIG. 4 is similar to FIG. 3 and illustrates operation of the fluid distribution system means for variations between loads whereby greater power requirements are evidenced in one of the pumps.

Attention is next directed to FIG. 4. Valves 40, 46, 47, and 48 are in the identical positions of FIGS. 1 and 3. However, the significance in FIG. 4 in contrast with FIG. 3 is the relocation of the spool in the valve 70. Attention is directed to the fact that fluid is communicated from the conduit 60a to the conduit 20j. This is, in effect, a by-pass around the unit 12. By-passing fluid by the unit 12 drops the pressure in the line 60 and increases the pressure across the pump unit 12'. The high pressure device 12' is thus supplied with greater energy content in the serially connected fluid distribution means 15. Moreover, the response of the valve 70 is tailored to the needs of the pumping unit 12'. That is to say, the opening of the spool valve 70 to communicate the mid-pressure line (the line 60) with the sump return is adjustable or variable to accommodate the exact demands of the unit 12 and 12'.

FIGS. 3 and 4 represent the extremities of movement of the spool; and smaller movements are possible. Thus, should the work demands of the units 12 and 12' vary only slightly, the opening provided by movement of the spool within the valve 70 communicating conduit 60a with either conduits 19j or 20j is slight and responsive to the actual load variation. The infinite number of positions provided for the spool valve 70 permits wide range demands of the two units.

Attention is next directed to FIG. 8 which illustrates a variation of the present invention. In FIG. 8, the mud intake is indicated at 116 and communicates with the pump unit 12'. In this regard, it will be noted that intake branch conduits 116a and 116b are connected to each end of the pump unit 12'. The double-acting pump unit 12' pressurizes the fluid drawn in through the mud intake 116 and expels the fluid into the conduit 117. The conduit 117 inputs the fluid through branch conduits 117a and 117b to the pump unit 12. A further increase in pressure is achieved within the pump unit 12 and the drilling fluid is expelled through ports 118a and 118b and collected in mud outlet line 119. In retrospect, it will be noted that the pumping structure shown in FIG. 1 incorporates parallel connection of the various pumping units between the intake line 16 and the outlet line 18. Thus, the structure in FIG. 1 utilizes the equivalent of four single-acting parallel pumps. On the other hand, the structure shown in FIG. 8 utilizes serial connection of the pump units through conduit 117 to achieve a much greater increase in pressure. The other details of the structure as shown in FIG. 8 remains similar to the structure shown in FIGS. 1–7, inclusive.

Attention is next directed to FIG. 9 of the present invention. The arrangement of apparatus shown in FIG. 9 enables serial operation with the distribution means of the present invention. Moreover, the power consuming devices are indicated generally at 125 and 127 and, by way of example, may comprise fluid motors. Of course, other devices are known in the hydraulic arts for the apparatus in FIG. 9. At any event, the inlet is provided at 119 and communicates directly with the fluid motor 125. The motor 125 extracts energy from the hydraulic fluid and the low pressure outlet of the motor 125 is communicated by conduit 126 to a second or low pressure device 127. The motor 127 also extracts energy from the fluid and returns same to the conduit 120 which is the exhaust line to the sump of the pumping apparatus. The generalized structure of FIG. 9 incorporates the demand valve 124 which again has three inputs, the inputs being high pressure through line 119a, the mid-pressure point supplied through conduit 126a, and the low pressure line 120a. All three of these lines are similar to the previously described conduits for the valve 70 shown in previous drawings. At any event, it will be appreciated from the foregoing discussion, that demands of the motors 125 and 127 are met by pressure fluid distribution through operation of the demand valve 124. Small lines communicate the pressure to the spool of the valve 124 to position the spool to communicate the conduits 119a or 120a with conduit 126a. This again achieves a by-pass of one of the fluid motors 125 or 127 and supplies a greater pressure drop to the motor not so by-passed. In retrospect, it will be noted that the demands of the devices 125 and 127 are again met even though the devices are serially connected which normally prevents relating the variable pressure drop to the devices.

Attention is directed to the fact that the demand valve 124 is similar to the valve 70 previously described. In the preferred embodiment, demand valves 70 and 124 are described with a two to one ratio between the end faces. However, this is not a limitation of the apparatus of the present invention. It is possible to provide the valve 70 with end faces having a different ratio. Then, operating pressure at the mid-point (the line 60 in FIG. 1) will be something other than the half pressure provided in the preferred embodiment. Moreover, the ratio of the two end faces can be related to the desired drops for the two power consuming devices communicated to enable the present invention to accommodate power consuming devices which consistently utilize power at different rates.

In conclusion, it will be understood and appreciated by those skilled in the art that the end face ratio is subject to variation.

The device of the present invention can be incorporated with pressure sources which vary themselves. Should the source pressure vary, the system is unaffected. By application of this virtue of the present apparatus to other systems, the present invention can be connected to a pressure source with some other power consuming device interposed therebetween. By way of example, if a source provides 4,000 p.s.i. pressure, a device providing a drop of 1,000 p.s.i is connected thereto, the device of the present invention will operate in the previously described manner.

The scope of the present invention is to be interpreted by the appended claims, and the preferred embodiment may be varied in details within the scope of the claims.

What is claimed is:
1. A multi-plex pump system comprising:
   (a) at least two cylinders;
   (b) a piston in each cylinder;
   (c) a fluid-tight chamber defined within said cylinders adjacent to said piston such that reciprocation of said piston alternately contracts and expands said chamber;
   (d) valve means for admitting fluid to be pumped to said chamber for compression, said means also communicating pumped fluid to an outlet;
   (e) power chamber means associated with each of said pistons for receiving therein a power fluid, said means responding to the pressure of the power fluid by imparting reciprocating motion to said pistons;
   (f) fluid distribution means serially communicating the power fluid to the several said power chamber means; and
   (g) demand means including in said distribution means for providing sufficient energy to each of said power chamber means in accordance with the respective load demand thereof.

2. The apparatus of claim 1 including a tubular extension projecting from the face of said piston, a stationary tubular sleeve sealingly fitting within said tubular extension to provide said fluid-tight cylinder, and additional means on said piston in said power chamber means and having a pair of surfaces exposed to power fluid therein for reciprocation of said piston.

3. The apparatus of claim 1 including four-way valve means communicating power fluid from said distribution means to opposite ends of said power chamber means, said valve means alternately admitting power fluid to said power chamber means for imparting reciprocating motion to a means therein having a pair of surfaces exposed to the power fluid.

4. The apparatus of claim 1 wherein said distribution means includes a power fluid by-pass means around each of said power chamber means, and wherein said demand means maintains said by-pass means in a normally closed condition.

5. The apparatus of claim 1 including an inlet communicating fluid to be pumped to said valve means of the first of said chambers, and means then communicating pumped fluid to said valve means of the second of said chambers.

6. The apparatus of claim 1 wherein said fluid-tight chambers are defined on opposite sides of each of said pistons, and including said valve means with each of said chambers, and further including an inlet means communicating fluid to be pumped to each of said valve means, and outlet means for receiving the pumped fluid from each of said chambers.

7. The apparatus of claim 1 including means for timing operation of pumps to obtain a phase angle in the operation thereof such that the termination of a reciprocation of one of said pistons coincides with a reciprocation of the other of said pumps.

8. A pump system having an inlet and an outlet comprising:
 (a) a pump body;
 (b) at least two pump units in said body, each unit including a cylinder;
 (c) a solid cylindrical piston in said cylinder having two opposing faces, each piston face having a tubular extension axially aligned with and spaced from the inner wall of said cylinder;
 (d) first end cap means at each end of said cylinder and defining between the inner wall of said cylinder and the outer walls of said extensions a fluid-tight chamber;
 (e) said first end cap means including sealing means and having a port for accepting fluid under pressure;
 (f) a stationary sleeve member snugly fitting in each extension;
 (g) second end cap means at one end of each sleeve member and including an inlet port and an exhaust port;
 (h) a source of fluid under pressure;
 (i) a four-way valve supplying an alternating flow of power fluid to said chamber on either side of said piston;
 (j) a control valve coupled to said source and to said four-way valve for timing the operation thereof in each of said pump units;
 (k) said control valves each having a movable spool;
 (l) means fixedly coupled to one of said extensions and to the spools of said control valves for positioning same relative to each other and for maintaining a fixed phase angle therebetween;
 (m) said alternating fluid driving said pistons in alternate directions, thereby creating alternate compressions and suctions in said sleeve members for pumping a fluid from said inlet to said outlet;
 (n) said source of fluid serially communicated with said pump units; and
 (o) demand valve means responsive to the load on said pump units for controlling the flow of power fluid to said pump units.

References Cited
UNITED STATES PATENTS

| | | | |
|---|---|---|---|
| 342,528 | 5/1886 | McGehee | 103—51 |
| 2,141,731 | 12/1938 | Wolfrom et al. | 103—49 |
| 2,942,553 | 6/1960 | Moeller et al. | 103—49 |
| 3,005,413 | 10/1961 | Coberly | 103—49 |
| 3,135,210 | 6/1964 | English | 103—49 |

ROBERT M. WALKER, *Primary Examiner.*